June 7, 1966  S. N. FOX ET AL  3,254,962
APPARATUS FOR OXIDIZING HYDROCARBONS
Filed Aug. 20, 1963
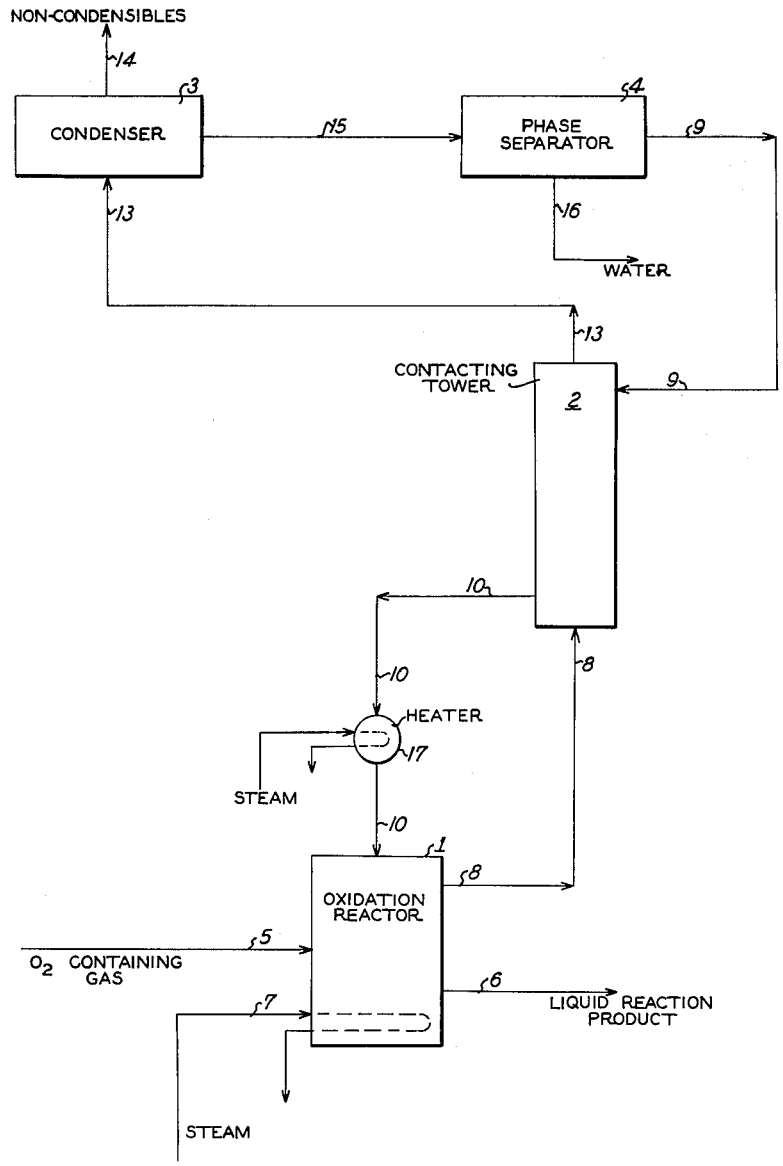
INVENTORS
SHERWOOD N. FOX
JOHN WHITE COLTON
BY  Bert J Lewen
ATTORNEY United States Patent Office 3,254,962
Patented June 7, 1966

3,254,962
APPARATUS FOR OXIDIZING HYDROCARBONS
Sherwood N. Fox, Stamford, Conn., and John White Colton, Pelham Manor, N.Y., assignors to Halcon International, Inc., a corporation of Delaware
Filed Aug. 20, 1963, Ser. No. 303,314
1 Claim. (Cl. 23—263)

The present application is a continuation in part of our copending application, Serial Number 140,794, filed September 26, 1961, now U.S. Patent 3,109,864.

This invention relates to a new and improved process and apparatus for the oxidation of hydrocarbons. More specifically, this invention teaches a process and apparatus for overcoming many difficulties hitherto unavoidable in hydrocarbon oxidation. Still more particularly, the instant invention describes means for overcoming problems in hydrocarbon oxidation wherein boron compounds are utilized to obtain the desired oxidation product.

In hydrocarbon oxidation the presence of water often interferes with the successful conversion to the desired reaction product. This water is formed by the oxidation reaction per se or introduced into the reactor from external sources.

One technique known to the prior art for removing water from the reactor is to withdraw it as a vapor along with unreacted vaporized hydrocarbons and non-condensible gases. The total of these vapors, known as "boil-up," are subsequently cooled; the water and hydrocarbons are condensed and settled; the water phase and the hydrocarbon phase are separated; and the water is discarded and the hydrocarbon is recycled to the reactor. Boil up rate is determined by many factors, such as the temperature and pressure of the reactor.

It has been found that the aforementioned procedure suffers from many disadvantages which make the overall process much less efficient and economically attractive.

Firstly, in order to separate the boiled up hydrocarbons and water it is necessary that they be cooled and condensed. Upon recycling the cold hydrocarbons, it becomes necessary to add large amounts of heat to the reactor to maintain proper reaction conditions.

Secondly, the condensation of the vaporous hydrocarbons requires the removal of large quantities of heat and sizable condensing surfaces. Such factors additionally increase the cost of the process.

Thirdly, even at the low temperature employed in the separation of the hydrocarbon-water condensate, complete removal of the water from the hydrocarbon phase is extremely difficult. This difficulty arises because of the presence of materials, perhaps surface active reaction products, which emulsify a portion of the water (referred to herein as "phased water") with the hydrocarbon phase.

In accordance with this invention, it has been found that the aforementioned difficulties can be overcome by directly contacting the reactor boil-up vapors with the hydrocarbon phase from the phase separator prior to recycle to the reactor.

This invention is particularly important in hydrocarbon oxidation processes where boron compounds such as meta boric acid are added to the reactor mass in order to modify the extent of the oxidation reaction. This is true because the presence of even small quantities of water destroys the effect of the added boron compound. For a complete disclosure of such reactions and the detrimental effect of water see U.S. application Serial No. 85,987 filed January 31, 1961, now abandoned. A wide variety of hydrocarbons may be oxidized according to the process and apparatus of the instant invention. Particularly applicable are lower molecular weight hydrocarbons having from 2 to 10 carbon atoms per molecule, preferably from 3 to 8. They may be either cyclic or acyclic compounds such as straight or branched chain paraffins including butane, pentane, methyl butane, etc. Particularly preferred are cycloalkanes, such as cyclohexane.

The attached figure is a schematic flow sheet illustrating the invention.

The batch oxidation reactor 1, which is charged with 308 parts of meta boric acid and 2711 parts of cyclohexane, is maintained at a temperature of about 330° F. and a pressure of 120 p.s.i.g. Air is introduced into the reactor 1 through line 5 and about 77 parts of $O_2$ absorbed. About 8% of the cyclohexane reacts and the liquid reaction mixture withdrawn through line 6. This reaction mixture is treated to recover the product in any desired manner, such as that disclosed in the aforementioned patent application. Heat is supplied to the reactor through means 7 in a conventional manner. A high boil-up is maintained and the vapors removed from the reactor through line 8 contain about 3200 parts of cyclohexane, 63 parts of water and 254 parts of nitrogen. These vapors, at a temperature of about 330° F., are passed to the contacting tower 2. This tower may be a spray tower, packed column or other conventional apparatus. In the contacting tower 2, the hot vapors are brought into direct contact with cold recycle liquid cyclohexane containing phased water. This latter stream, containing about 1500 parts of cyclohexane and about 15 parts phased water, enters the contacting tower 2 through line 9 at a temperature of about 100° F. The contact of the two streams results in (1) the condensation of about 1500 parts of cyclohexane and the cooling of the remaining vapors; (2) the heating of the cyclohexane liquid to about 310° F. and (3) the stripping out of the phased water from the liquid recycle stream. The heated cyclohexane stream is withdrawn from the contacting tower 2 through line 10 and contains about 3000 parts of essentially water free cyclohexane. This stream is passed back to the oxidation reactor 1 wherein it may undergo further reaction. If desired, prior to recycling, it may be heated in the heater 17 thereby decreasing the heat added directly to the oxidation reactor. A large portion of the liquid may be vaporized. The cooled vapors (containing 1700 parts of cyclohexane, over 70 parts of water, and 254 parts of nitrogen) leave the top of the contacting tower 2 through line 13, and pass to condenser 3 wherein essentially all of the cyclohexane and water are condensed. Non-condensible gases, e.g. nitrogen, are removed via line 14. This stream contains about 200 parts of cyclohexane vapor which may be recovered in a subsequent scrubbing operation. Through line 15, the cyclohexane-water condensate, at a temperature of about 100° F. passes to phase separator 4. About 63 parts of water are removed from the bottom of the separator 4 through line 16 as the water phase and discarded. About 1500 parts of cyclohexane containing phased water are removed via line 9 and processed as previously described.

The above example is illustrative of the invention only and is not intended to be definitive thereof. Many modifications are within the spirit of the instant invention.

For example, the cyclohexane stream line 10 may be heated in order to reduce the heat requirements through line 7.

The non-condensible stream leaving the condenser 3 through line 14 may be recycled to the reactor. Such procedure is particularly advantageous wherein oxygen concentrations less than that of air are desirable.

The temperatures, pressures and flow rates to the various units described above may be readily selected by those skilled in the art. These conditions are dependent on such factors as the particular hydrocarbon undergoing reaction, the amount of oxygen feed to the reactor, the amount of boil-up, and efficiency of the contacting tower and condenser.

It will be understood that modifications and variations may be effected without departing from the spirit of the invention.

We claim:

Apparatus for the oxidation of liquid hydrocarbons which comprises: an oxidation reactor having internal heating means, consisting solely of a closed heating system, means for introducing reactant gases below the level of liquid hydrocarbons in said reactor, means for withdrawing liquid reaction product, said means being positioned below said means for introducing reactant gases, means for passing vapor overhead from said reactor to vapor-liquid contacting means, said means for passing vapor from said reactor being connected to the lower portion of said vapor-liquid contacting means, means for passing vapor overhead from said contacting means to a condenser, said condenser having means for venting non-condensible gases, means for passing condensed material from said condenser to a phase separator, means for withdrawing water from the bottom of said phase separator, means for passing liquid hydrocarbon from said phase separator to the upper portion of said vapor-liquid contacting means, said means being located below said means for passing vapor from said contacting tower to said condenser, means connected to the bottom of said contacting tower for passing liquid hydrocarbon into heating means, and means for passing said hydrocarbon from said heating means to said reactor.

References Cited by the Examiner
UNITED STATES PATENTS

| | | | |
|---|---|---|---|
| 1,603,851 | 10/1926 | Lummus | 23—263 X |
| 2,746,844 | 5/1956 | Johnson et al. | 23—263 X |

MORRIS O. WOLK, *Primary Examiner.*

J. H. TAYMAN, JR., *Assistant Examiner.*